United States Patent [19]
Rilly et al.

[11] Patent Number: 5,657,218
[45] Date of Patent: Aug. 12, 1997

[54] SWITCH MODE POWER SUPPLY CIRCUIT

[75] Inventors: Gerard Rilly, Unterkirnach; José I. Rodriguez Duran; Markus Rehm, both of Villingen-Schwenningen, all of Germany

[73] Assignee: Deutsche Thomson Brandt GmbH, Villingen-Schwennngen, Germany

[21] Appl. No.: 454,930

[22] Filed: May 31, 1995

[30] Foreign Application Priority Data

Sep. 7, 1994 [DE] Germany .......................... 44 31 783.2
Dec. 17, 1994 [DE] Germany .......................... 44 45 220.9

[51] Int. Cl.$^6$ .......................... H02M 3/24; H02M 7/44
[52] U.S. Cl. .......................... 363/97; 363/49
[58] Field of Search .......................... 363/49, 97; 323/242, 323/288, 289, 901, 903

[56] References Cited

U.S. PATENT DOCUMENTS

| | | | |
|---|---|---|---|
| 4,246,634 | 1/1981 | Purol | 323/901 |
| 5,285,369 | 2/1994 | Balakrishnan | 363/49 |
| 5,452,195 | 9/1995 | Lehr et al. | 363/21 |
| 5,469,349 | 11/1995 | Marinus | 363/97 |

*Primary Examiner*—Stuart N. Hecker
*Attorney, Agent, or Firm*—Joseph S. Tripoli; Frederick A. Wein

[57] ABSTRACT

In a switch mode power supply which includes a transformer for DC isolation and a switching transistor, a control transistor which controls the switching transistor is switched on by an appropriate control voltage during the isolating phase until the collector voltage of the switching transistor has fallen to a minimum. The control transistor is preferably switched on during the isolating discharge time and the subsequent oscillation phase of the transformer.

15 Claims, 2 Drawing Sheets

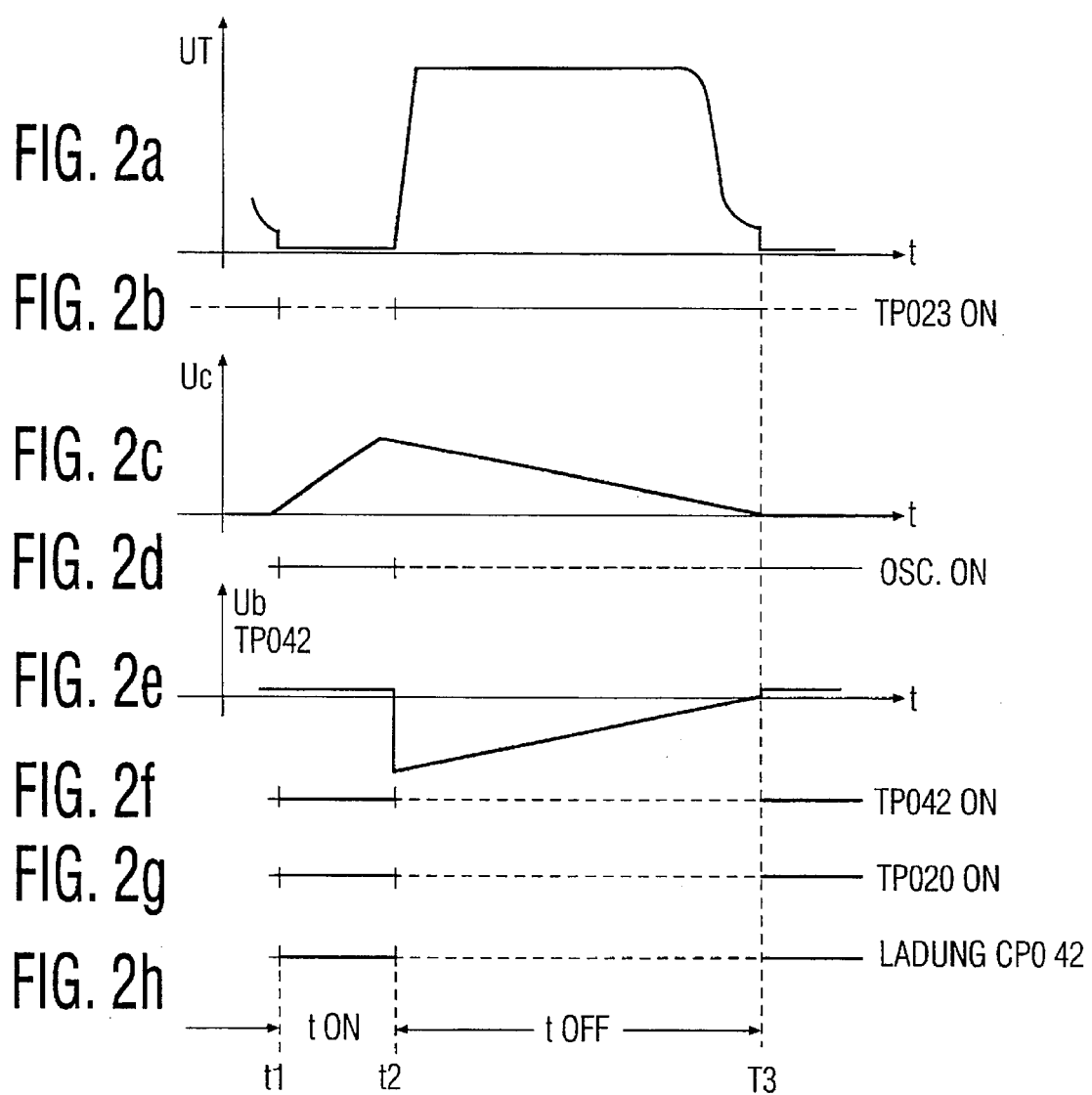

SWITCH MODE POWER SUPPLY CIRCUIT

BACKGROUND

The invention is based on a switch mode power supply. Such a switch mode power supply includes, inter alia, a periodically operated switching transistor and a transformer in order to achieve DC isolation and for producing operating voltages of different amplitude and polarity. In practice, efforts are being made to reduce the size of the transformer in order in this way to reduce costs and weight. Such a reduction in the size of the transformer is possible by increasing the operating frequency of the switch mode power supply, for example from 30 kHz to 120 kHz. However, in the case of such an operating frequency increase, the so-called switching-on losses of the switching transistor rise in proportion to the operating frequency and reach unacceptably high levels.

The object of the invention is to develop a switch mode power supply without any significant additional components such that the switching-on losses of the switching transistor are minimized and the transformer can be reduced in size without unacceptably increasing the switching-on losses.

In the case of the invention, the control transistor, which controls the switching transistor, is switched on during the isolating phase of the switching transistor until the collector voltage of the switching transistor has fallen to a minimum.

This results in the following advantageous effect. A switch mode power supply having an operating frequency of 25 kHz has switching-on losses on the switching transistor of approximately 0.6 W. If the operating frequency were increased by a factor 4 to approximately 100 kHz, the switching-on losses would thus rise to approximately 2.4 W. However, controlling the switching transistor according to the invention makes it possible to achieve switching-on losses of approximately 0.04 W. This advantageous effect is thus achieved merely by a particularly advantageous method of controlling the control transistor, while additional components are virtually unnecessary. Reducing the size of the transformer also allows the size of the printed circuit board (PCB=printed circuit board) which is fitted with the transformer to be reduced. In addition, as a result of the considerable reduction in the switching-on losses on the switching transistor, the heat sink which is provided for this transistor can also become smaller or can even be entirely omitted. The same applies to the resistor and the diode on the so-called snubber.

The control transistor is preferably controlled by an oscillator which carries out a plurality of functions. The oscillator produces the control voltage for the control transistor and, in consequence, for the switching transistor. The oscillator is additionally used as a starting oscillator, by one input of the oscillator being connected to the mains terminals. The oscillator is additionally used to vary the operating frequency of the switch mode power supply as a function of the respectively emitted power and, in consequence, enables a standby mode with a greatly reduced power of, for example, 5 W without so-called packet operation being required for controlling the switching transistor for this purpose. A voltage which is proportional to the mains power supply is applied to one control input of the oscillator and a voltage which is dependent on the amplitude of the control voltage, which is used for stabilization of the operating voltage produced, is applied to the other control input. In addition, a voltage is applied to the oscillator which voltage is derived from the control circuit and, in the standby mode, reduces the frequency of the oscillator and thus the operating frequency of the switch mode power supply as the power output drops. The oscillator thus makes it possible to control the switching transistor as a function of the mains voltage and of the power. At the same time, a charging path is located in the base path of the switching transistor, between the mains terminals and the isolating capacitor, which charging path is dimensioned such that the charging current of the isolating capacitor increases as the mains voltage rises.

The control transistor is preferably supplemented by a second transistor to form a circuit having a thyristor characteristic or a Darlington circuit.

In the case of a development, a partial winding of an additional primary winding of the transformer is connected to the isolating capacitor via a rectifier circuit. In this case, one end of the additional primary winding is connected via a rectifier circuit to a current measuring resistor at the emitter of the switching transistor.

BRIEF DESCRIPTION OF THE DRAWINGS

The invention is explained in the following text with reference to the drawing, in which:

FIG. 2 shows curves in order to explain the method of operation of the circuit according to FIG. 1.

DETAILED DESCRIPTION OF THE PREFERRED EMBODIMENT

Figure 1:
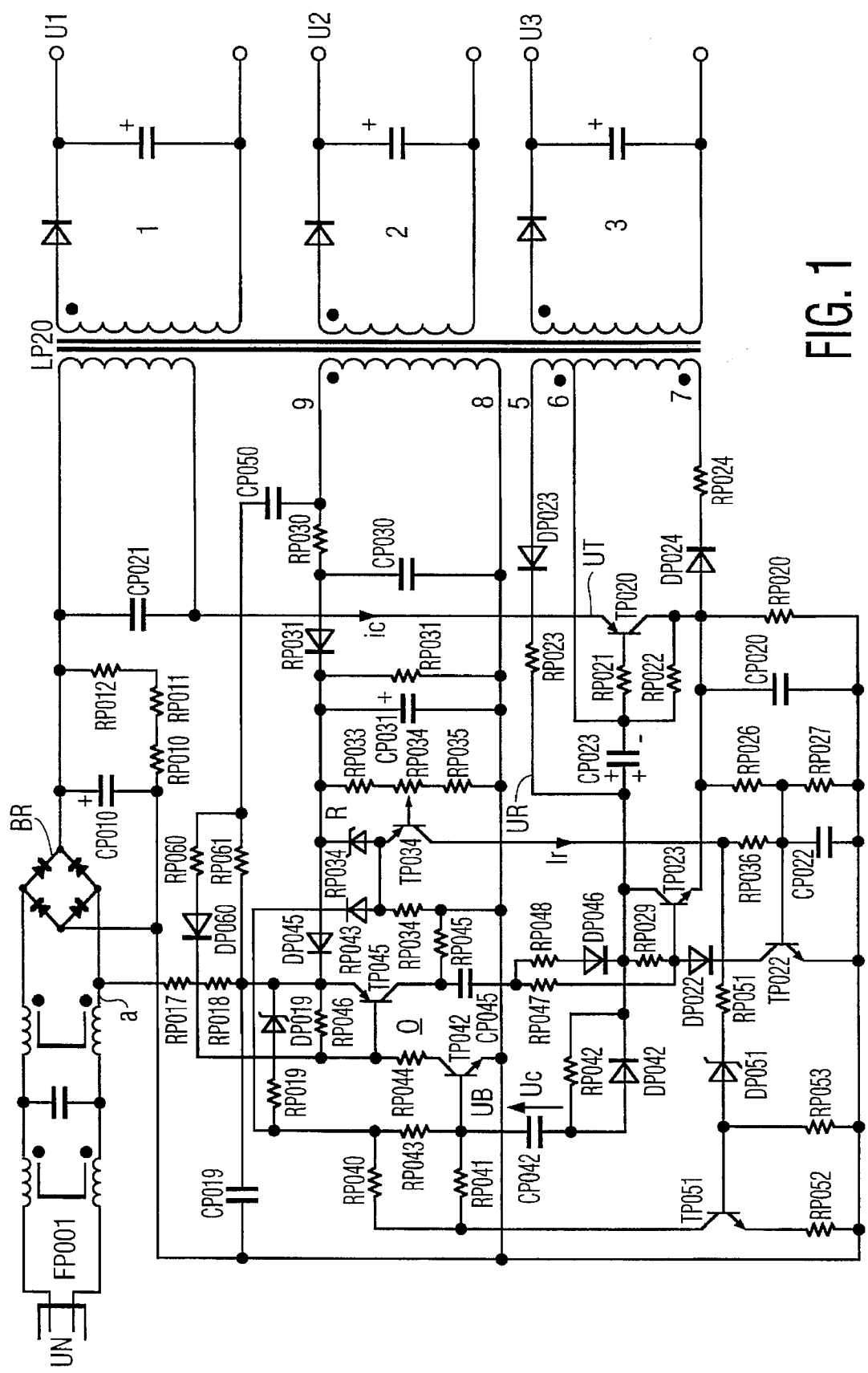
FIG. 1 shows a complete circuit diagram of a switch mode power supply designed according to the invention.

FIG. 1 shows, inter alia, the mains voltage UN, the mains rectifier BR, the transformer LP20 which is used for DC isolation and transformation, rectifier circuits 1, 2, 3 for producing operating voltages U1, U2, U3, the control oscillator O with the transistors TP042, TP045, the actual switching transistor TP020, the isolating capacitor CP023, the driver circuit with the control transistor TP023 and the transistor TP022, the control circuit, which is used for stabilization, with the diode DP031, the transistor TP034 and the diode DP034, the so-called snubber capacitor CP021, and the starting circuit with the starting resistors RP017 and RP018.

The method of operation of this circuit is explained successively in the following text, with reference to FIG. 2, for various functions.

Control of the switching transistor in order to reduce the inrush losses

The switching transistor TP020 is switched off during the time toff. This switching off is accomplished by the isolating capacitor CP023, which is charged to the illustrated polarity during the switching-on time ton, being drawn to ground at its left-hand, positively charged electrode by means of the transistors TP023 and TP022, which are switched on. A negative voltage is thus produced on the base of TP020, which switches TP020 off. If no special measures were adopted, the transistor TP020 would be switched on again at the end of the isolating time if a significant voltage UT were still present on its collector. The transistor TP020 must then initially discharge the snubber capacitor CP021 so that unacceptably high switching-on losses occur on TP020.

The control of the control transistor TP023, and thus the switching on of TP020, are now carried out at the time t3, at a time at which the voltage UT on the collector of TP020 has fallen to a minimal value. TP020 now switches on virtually at a very low voltage UT, so that the said switching-on losses are largely avoided. The control transistor TP023, which is used per se for switching TP020 off at the time t2 is thus additionally used to switch TP020 on delayed in such a manner that no significant switching-on losses are any longer produced in each case during this switching on.

Starting phase

When the switch mode power supply is switched on, the mains voltage appears at the point a of the mains rectifier BR virtually without any delay. The capacitor CP019 is in consequence initially charged via the resistors RP017 and RP018. When the voltage on CP019 becomes greater than the zener voltage of DP019, a current passes into the capacitor CP042 and to the base of TP042. This transistor is switched on and thus also switches TP045 on. The capacitor CP019 is now discharged via the path TP045-CP045-RP048-DP046 into the capacitor CP023 and, further, into the base of TP020, so that TP020 can be switched on. The starting comprises a 50 Hz packet operation with a switching frequency of approximately 2 kHz. Thus, initially, the transformer LP20 transmits only a very small amount of power which does not lead to any unacceptable operating state in the event of the output voltages being short-circuited (no increased temperature, no components are destroyed). As the output voltages rise, the zener voltage of DP034 is exceeded. Current additionally flows via DP043 into the base of TP042 and a continuous switching frequency of approximately 100 kHz is produced which results in a large amount of power being transmitted through the transformer. The advantages of this special starting process are not only the protection precautions, which are relevant. to safety, but also the extremely low starting current (maximum 230 A rms) which reduces the power loss in an otherwise conventional 4-watt starting resistor to 40 mW. The transistors TP042 and TP045 form a control oscillator for controlling TP020, which control oscillator, in the normal mode, produces the turn-on pulse for switching TP020 on periodically. Since the isolating capacitor CP023 is charged at the same time that the switching transistor TP020 is switched on, this guarantees that the switching transistor is reliably switched off even in the case of the very first pulse.

Switching of the switching transistor TP020

In order to switch TP020 off, TP022 and TP023 are switched on as a result of the rising collector current on the measuring resistor RP020. The cathode of DP042 is then virtually at ground. The precharging of CP042 results in a negative voltage on the base of TP042. TP042 is thus switched off. CP042 is charged with a current which, overall, has two paths, to be precise directly from the mains power supply via RP019 during starting and via DP043, RP043, RP040 and RP041 by means of a voltage which is derived from the control circuit. If, for example, the secondary voltages U1, U2, U3 rise, this charging current increases as a function of the voltage in the control loop. When CP042 is charged to 0.7 V, TP042 is switched on again. TP045, which is being switched on, receives a positive voltage at the collector, which voltage represents a pulse for the charging path of CP045. In consequence, DP046 becomes forward biased, produces a base current pulse for TP020 and, at the same time, switches the control transistor TP023 off via RP047. After this, a base current flows through the positive feedback winding of the transformer LP20, from the base winding 6, 7. When TP020 is switched on, DP024 becomes forward biased and transforms the voltage into a base current through RP021 and RP024, into the base of TP020. The resistor RP022 at the base of TP020 can be dimensioned to be relatively small, at approximately 4.7 kOhm. This has the advantage that the base circuit, which is sensitive to external influences, has a relatively low resistance and external interference voltages have only a minor influence on the circuit.

Control for stabilization

The stabilization of the output voltages U1, U2, U3 is achieved by control on the primary side. A voltage which represents the amplitude of U1, U2, U3 is picked off from the primary winding 8, 9 of the transformer LP20 and is supplied to the control circuit R which has the transistor TP034, the zener diode DP034 and the normal illustrated components. The control current Ir obtained from this passes via RP036 to the thyristor or Darlington circuit having the transistors TP022 and TP023 and causes the current ic through the switching transistor TP020 to be switched off as a function of the amplitude of U1, U2, U3. The amplitude of the output voltages U1, U2, U3 is stabilized by this control of the collector current ic of TP020.

Frequency variation in the standby mode

It is assumed that the switch mode power supply is operating in the normal mode with an increased frequency of 120 kHz. The power emitted in the standby mode is greatly reduced by disconnecting the loads which are connected to U1, U2, U3, for example from 80 W to 5 W. In consequence, the frequency would intrinsically rise which, however, would be unacceptable because of the excessively short switching-on time. The circuit is now dimensioned such that it operates at 150 kHz and 35 W in the normal mode. The operating frequency is now reduced to approximately 20 kHz in the standby mode. In consequence, the power is reduced by a factor of 7 to approximately 5 W, which corresponds approximately to the power for the standby mode. It is advantageous in this case that a standby mode is now possible without any so-called packet operation. The switching-on time ton can now be selected to be longer, in an advantageous manner, since the frequency is correspondingly reduced. The current is likewise correspondingly small, so that the temperature on the switching transistor TP020 does not rise unacceptably.

The standby mode at the reduced frequency is produced in the illustrated circuit as follows. The frequency variation is produced by means of the transistor TP051, which reduces the charging current, which determines the frequency, for the capacitor CP042. TP051 is controlled by the output of the control circuit R. If the current in TP034 of the control circuit R rises, the power is reduced. The voltage on the resistor RP036 rises. If a threshold value voltage, which is predetermined by the zener diode DP051, is exceeded, TP051 switches on and reduces the frequency of the oscillator O and thus the operating frequency of the switch mode power supply.

FIG. 2a shows the voltage UT on the collector of TP020. It can be seen that the voltage UT has assumed a minimum value at the time t3 when TP020 is switched on. FIG. 2b shows that the control transistor TP023 remains switched on until the voltage UT has reached the said minimal value. FIG. 2c shows the voltage Uc on CP042. FIG. 2d shows that the oscillator is switched on during the switched-on time ton and is switched off during the switched-off time toff of TP020. FIG. 2e shows the voltage Ub on the base of TP042. FIG. 2f shows when TP042 is switched on and is switched off, while FIG. 2g shows the same for TP020. FIG. 2h shows when CP042 is charged.

A further type of loss in such a switch mode power supply is the losses on the starting resistors between the mains rectifier and the starting circuit. Because of the high voltage on the mains rectifier and because of the starting current required, these resistors must be dimensioned to approximately 4 watts and result in a relatively high power loss in the order of magnitude of 1 watt.

A further solution is based on the object of reducing the losses on the starting resistor in the case of such a switch mode power supply. This object is achieved in that the said starting resistor is essentially connected only to a capacitor, which determines the frequency and supplies the starting voltage, of the oscillator, which makes possible a large reduction in the starting current. In this case, the resistor is preferably dimensioned to have such a high resistance that the power loss on the resistor is in the order of magnitude of 33 mW. The starting resistor is preferably increased from 27 kOhm in the case of known circuits to an order of magnitude of 800 kOhm, and the current is correspondingly reduced.

This variant is likewise illustrated in FIG. 1. The starting resistor having the increased value of approximately 800 kOhm is formed by the resistors RP017 and RP018. The said frequency-determining capacitor is the capacitor CP042 of the oscillator O, and the capacitor which supplies the starting voltage is CP019. In the steady state, the operating voltage for the oscillator O is supplied by the winding 8, 9 of the transformer LP20 via the rectifier RP031 and the capacitor CP031.

We claim:

1. A switch mode power supply having a switching transistor and an isolating capacitor which is located in the base path of said switching transistor and whose end facing away from the base is connected at a charging path and, via a control transistor which is switched on in order to switch the switching transistor off, to ground, wherein the control transistor is switched on, during the phase in which the switching transistor is switched off, until the collector voltage of the switching transistor has fallen to a minimum.

2. The power supply as claimed in claim 1, wherein the control transistor is switched on during the isolating discharge time and the subsequent oscillation phase of the transformer.

3. The power supply as claimed in claim 1, wherein the control transistor is controlled by an oscillator which is additionally used as a starting oscillator for the switch mode power supply.

4. The power supply as claimed in claim 3, wherein a voltage which is proportional to the mains power supply is applied to one control input of the oscillator, and a voltage which is dependent on the amplitude of the control voltage which is used for stabilization of the operating voltages which are produced is applied to the other control input.

5. The power supply as claimed in claim 1, wherein a charging path is provided between the mains terminals and the isolating capacitor, which charging path is dimensioned such that the charge on the isolating capacitor increases as the mains voltage rises.

6. The power supply as claimed in claim 1, wherein the control transistor is supplemented by a second transistor to form a circuit with a thyristor characteristic or a Darlington circuit.

7. The power supply as claimed in claim 1, wherein a partial winding of an additional primary winding of the transformer is connected to the isolating capacitor via a rectifier circuit.

8. The power supply as claimed in claim 7, wherein one end of the additional primary winding is connected via a rectifier circuit to a current measuring resistor at the emitter of the switching transistor.

9. The power supply as claimed in claim 1, wherein the circuit is designed such that the operating frequency of the switch mode power supply increases as the power drops.

10. The power supply as claimed in claim 9, wherein the operating frequency is reduced approximately in the same ratio as the reduction in the power for the standby mode.

11. The power supply as claimed in claim 10, wherein a network having a resistor and a transistor is connected in parallel with a charge capacitor, which determines the operating frequency of the oscillator, to the base of which transistor a control voltage is applied via a threshold value circuit, which control voltage is derived from the output of a control circuit which is used for stabilization.

12. The switch mode power supply having an isolating transformer and a switching transistor which is switched on and off periodically by means of a switching voltage from an oscillator, and having a starting circuit with a resistor between a mains terminal and a point which supplies an operating starting voltage for the oscillator, wherein the resistor is essentially connected only to a capacitor, which determines the frequency and supplies the starting voltage, of the oscillator.

13. The power supply as claimed in claim 12, wherein the starting resistor is dimensioned to have such a high resistance that the power loss in the starting resistor is in the order of magnitude of 40 mW.

14. The power supply as claimed in claim 13, wherein the resistor is in the order of magnitude of 1 M$\Omega$.

15. The power supply as claimed in claim 12, wherein the operating voltage for the oscillator in the normal mode is obtained from a winding of the isolating transformer, via a rectifier.

* * * * *